United States Patent [19]

Schlaeppi et al.

[11] Patent Number: 4,893,998

[45] Date of Patent: Jan. 16, 1990

[54] INSTALLATION FOR PRODUCING A FIBER OPTIC CABLE COMPONENT

[75] Inventors: René Schlaeppi, Prilly; Rémy Bruggman, Brent, both of Switzerland

[73] Assignee: Maillefer S.A., Ecublens, Switzerland

[21] Appl. No.: 197,314

[22] Filed: May 23, 1988

Related U.S. Application Data

[62] Division of Ser. No. 804,119, Dec. 3, 1985, Pat. No. 4,772,435.

[30] Foreign Application Priority Data

Dec. 14, 1984 [CH] Switzerland ......................... 5966/84

[51] Int. Cl.$^4$ ........................ B29C 47/88; B29D 11/00
[52] U.S. Cl. ....................................... 425/114; 118/69; 118/419; 264/1.5; 264/174; 264/211.18
[58] Field of Search ................. 118/69, 419, DIG. 18, 118/DIG. 19, DIG. 20; 264/1.5, 1.6, 2.7, 173, 174, 177.17, 211.15, 211.18, 234, 237, 279, 348; 425/71, 114; 427/162, 169, 172, 398.1, 398.3

[56] References Cited

U.S. PATENT DOCUMENTS

| | | | |
|---|---|---|---|
| 3,055,778 | 9/1962 | Rhodes | 264/174 |
| 3,544,665 | 12/1970 | Bowers | 425/71 |
| 3,604,392 | 9/1971 | Kawazoe et al. | 118/69 |
| 3,728,424 | 4/1973 | Bauer | 264/174 |
| 3,729,539 | 4/1973 | Hill | 264/237 |
| 3,849,192 | 11/1974 | Schmidt | 264/237 |
| 4,078,111 | 3/1978 | Yamaguchi et al. | 264/174 |
| 4,089,923 | 5/1978 | Theodossi et al. | 264/174 |
| 4,134,953 | 1/1979 | Dembiak et al. | 264/237 |
| 4,154,783 | 5/1979 | Jackson | 264/174 |
| 4,369,688 | 1/1983 | Yunan | 425/114 |
| 4,414,165 | 11/1983 | Oestreich et al. | 264/1.5 |
| 4,458,476 | 7/1984 | Mayr et al. | 264/1.5 |
| 4,541,979 | 9/1985 | Cooke et al. | 425/114 |
| 4,583,929 | 4/1986 | Becker et al. | 264/1.5 |

FOREIGN PATENT DOCUMENTS

| | | | |
|---|---|---|---|
| 15425 | 2/1980 | European Pat. Off. | |
| 2512371 | 7/1976 | Fed. Rep. of Germany | 264/174 |
| 2845887 | 4/1980 | Fed. Rep. of Germany | 264/1.5 |
| 3239024 | 4/1984 | Fed. Rep. of Germany | |
| 53-145084 | 12/1978 | Japan | 264/237 |
| 2017335 | 10/1979 | United Kingdom | |

Primary Examiner—Jay H. Woo
Assistant Examiner—C. Scott Bushey
Attorney, Agent, or Firm—Oliff & Berridge

[57] ABSTRACT

The optical fiber paid out from a reel passes through an extrusion head, then through a cooling vat, the sheath extruded around it being pulled by a withdrawal device. The sheath then passes through a second vat, when the stranding element is withdrawn by an auxiliary withdrawal device under as low a tension as possible. In the second vat, the stranding element is reduced to a temperature lower than the ambient temperature so that contraction of the sheath ensures the excess length of the optical fiber.

2 Claims, 2 Drawing Sheets

INSTALLATION FOR PRODUCING A FIBER OPTIC CABLE COMPONENT

This is a division of application Ser. No. 06/804,119 filed Dec. 3, 1985, now U.S. Pat. No. 4,772,435.

BACKGROUND AND SUMMARY OF THE INVENTION

This invention relates to cable manufacture, and more particularly to an installation for producing a fiber optic stranding element, of the type having at least one payout reel for a light-waveguide component, an extrusion head, a cooling device, and a device for receiving a finished stranding element. The invention also relates to further the stranding element thus produced.

During the manufacture of fiber optic cable, the fiber component or components must be longer than the surrounding sheath or sheaths. One major problem which thus presents itself in such manufacture is that of controlling this excess length of the fiber waveguide component(s) as compared with the sheath component(s). The light-waveguide(s), formed of fibers exhibiting a certain fragility, must be loose in their protective sheath; and care must be taken that the deformation to which the stranding element will be subjected when it is wound on the takeup reels, then during handling and laying, is not apt to damage the fragile constituents of the fibers. European Patent No. 0 015 425, for example, describes means which may be provided for ensuring that light-waveguide components are loose within their protective sheaths.

It is an object of this invention to provide an improved installation for producing fiber optic cable whereby the light-waveguide components are given the necessary excess length within the sheath or sheaths.

A further object of this invention is to provide an improved method of producing such fiber optic cable in order to achieve this excess length.

To this end, in the installation according to the present invention, of the type initially mentioned, the payout reel or reels are provided with brakes whereby the tension of the guide component or components can be regulated, the cooling device comprises a first vat adjusted for cooling the stranding element to a first temperature $T_1$, a main withdrawal means for pulling the stranding element through the extrusion head and the first vat, a second vat adjusted for cooling the sheath to a second temperature $T_2$ lower than the temperature $T_1$, and auxiliary withdrawal means capable of pulling the stranding element through the second vat with as low a tractive force as possible, and the receiving device is capable of receiving and driving takeup reels for storing the stranding element at the exit of the auxiliary withdrawal means.

In the method according to the present invention, likewise of the type initially mentioned, the cooling is effected in two successive stages, the waveguide component and the sheath are subjected to predetermined tensile stresses during the first stage of cooling, whereas during the second stage, the waveguide component is slack and the sheath is subjected to as low a tensile stress as possible, and the cooling temperature obtained during the second stage is lower than that obtained during the first stage.

BRIEF DESCRIPTION OF THE DRAWINGS

A preferred embodiment of the invention will now be described in detail with reference to the accompanying drawings, in which.

DETAILED DESCRIPTION OF THE PREFERRED EMBODIMENTS

Figure 1:
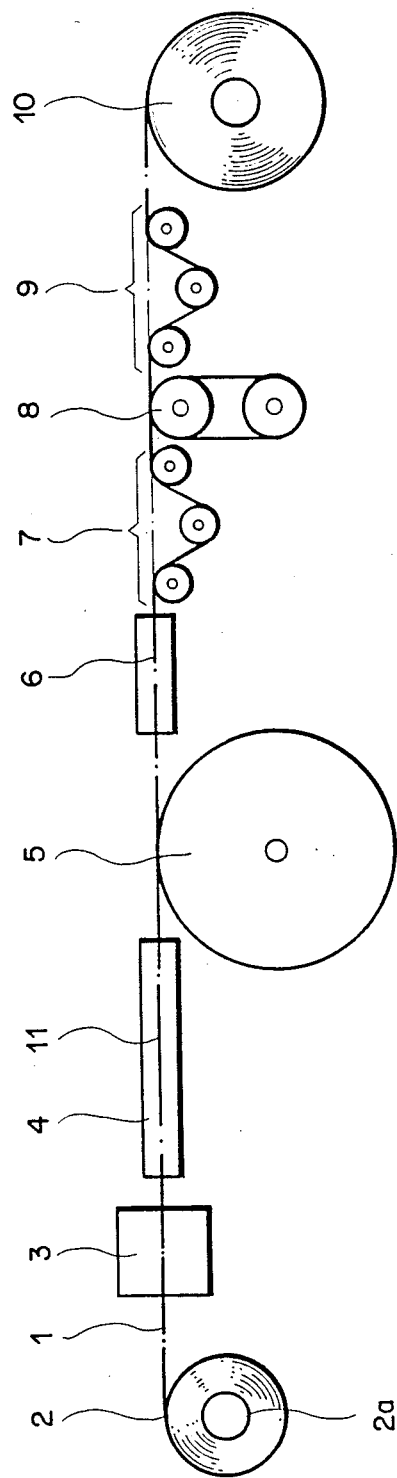
FIG. 1 is a diagram of the various elements of the installation.

In the installation illustrated in FIG. 1, a light-waveguide 1, hereafter to be called "optical fiber," is borne by a payout reel 2 and paid out at a tension Ff, maintained at a value ensuring that the fiber remains taut all the way to a main withdrawal device, or extractor, 5. Tension Ff is maintained by means of a magnetic brake 2a acting upon reel 2 and may vary between 20 and 100 grams.

Restrained by payout reel 2, optical fiber 1 enters an extrusion head 3 fed from a conventional extruder, so that a sheath 11 of plastic material forms around fiber 1. Upon leaving head 3, therefore, fiber 1 is encased in sheath 11, this operation being carried out in such a way that fiber 1 remains loose within sheath 11. The latter then enters a first cooling vat 4, supplied with water, for instance, and adjusted so that the encased fiber is kept at a predetermined temperature $T_1$. The length of vat 4 is calculated as a function of the rate of travel of sheath 11 so as to stabilize the temperature thereof, even at the maximum output speed of the line.

Upon leaving vat 4, the temperature of sheath 11 is equal to $T_1$. It passes onto main extractor 5, consisting, for instance, of a large-diameter pulley over which sheath 11 makes several turns. Main extractor 5 is rotatingly driven at a constant speed to pull fiber 1 through extrusion head 3. Extractor 5 is kept at temperature $T_1$. In one particularly advantageous embodiment of the invention, extractor 5 may be accommodated within vat 4.

Figure 2:
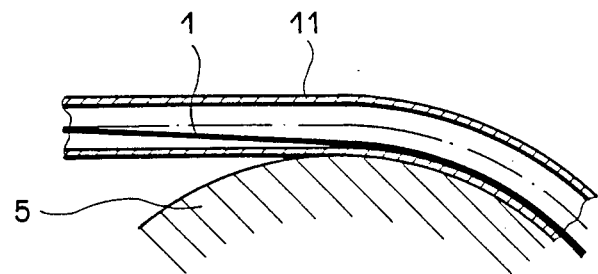
FIG. 2 is a diagrammatic detail view on a larger scale, showing the position of the stranding element upon entering the main withdrawal device.
Figure 3:
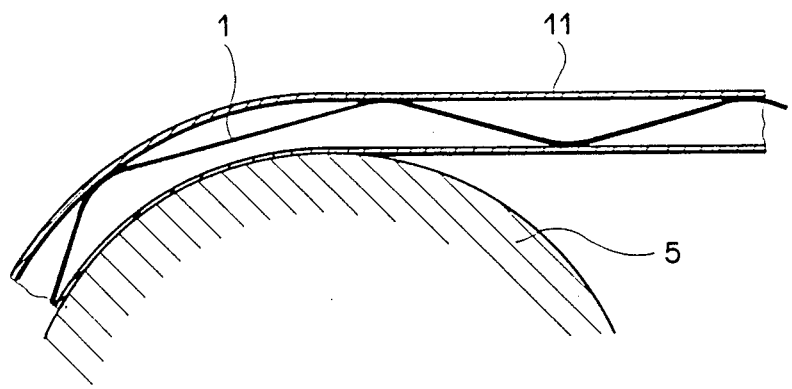
FIG. 3 is a view similar to that of FIG. 2, showing the position of the stranding element upon leaving the main withdrawal device preparatory to entering the second cooling vat.

After leaving main extractor 5, sheath 11 enters a second cooling vat 6 designed to reduce its temperature to $T_2$, which is not only lower than $T_1$ but even lower than the ambient temperature at which the finished stranding elements received on takeup reels 10 are to be stored. To pull sheath 11 through vat 6, there are provided an auxiliary withdrawal device, or extractor, 8, capable of storing a certain length of stranding element, and two pulley assemblies 7 and 9, one disposed between vat 6 and auxiliary extractor 8, the other between the latter and a winder 10 bearing the takeup reel. Pulley assemblies 7 and 9 are designed to ensure that the stranding element is moved at a tension Ft which is as low as possible. It will be realized that, under these conditions, the transition from temperature $T_1$ to temperature $T_2$ causes sheath 11 to contract, thus giving waveguide 1, accommodated within sheath 11, a certain excess of length. At the entry into extractor 5 (see FIG. 2), waveguide 1 is held taut within sheath 11 as a result of the tensile stress caused by brake 2a, which may be a hysteresis brake, for example. Upon leaving extractor 5, on the other hand, waveguide 1 is completely relaxed within sheath 11, as shown in FIG. 3.

It follows from the foregoing that if sheath 11 has an outside diameter D and an inside diameter d, and if the light-waveguide has a diameter df, provision is made for an appreciable difference between diameter d and diameter df, even in the case where a single waveguide is accommodated in the sheath.

However, it should be clearly understood that the installation and method described above are equally applicable to the case where a plurality of optical fibers 1 are situated together within the same sheath 11. The same installation and method are likewise applicable when several groups of optical fibers, each jacketed within a protective sheath, are encased simultaneously in an outside sheath intended to protect the cable as a whole.

Temperature $T_1$ corresponds to a partial cooling of sheath 11 and waveguide 1. The value of this temperature will be determined as a function of the size and the materials used. It will preferably be higher than the ambient temperature. The decisive effect for obtaining the desired result is that, after the contraction undergone by sheath 11 during the second cooling stage, at as low a tension as possible, the length of sheath 11 is fixed on auxiliary extractor 8 and takeup reel 10, so that the excess length of the light-waveguide component(s) is preserved. This excess length is thus determined by the difference between the cooling temperatures $(T_1-T_2)$. Hence, cooling of the stranding element is carried out in two stages, viz., a first cooling stage carried out at a predetermined tension, whereby the optical fiber is pulled through the extrusion head, then a second stage carried out with the stranding element in a state of zero tension, so that the length can contract freely. This free contraction gives the optical fiber a slight excess of length within its sheath, thus allowing the stranding element to be subsequently manipulated without any risk of damage to the fiber.

What is claimed is:

1. An installation for producing a fiber optic stranding element formed of at least one light-waveguide component loosely encompassed in at least one sheath, said installation comprising:
   at least one payout reel for holding at least one light-waveguide component,
   an extrusion head located downstream of said at least one payout reel for forming at least one sheath loosely encompassing said at least one light-waveguide component to form said stranding element,
   braking means associated with said at least one payout reel for regulating the tension of said at least one light-waveguide component,
   cooling means for cooling said at least one sheath, said cooling means being located downstream of said extrusion head and including a first vat for cooling said at least one sheath to a first temperature $T_1$ and a second vat for cooling said at least one sheath to a second temperature $T_2$ lower than said temperature $T_1$,
   main withdrawal means for simultaneously pulling said at least one light-waveguide component through said extrusion head and said stranding element through said first vat,
   auxiliary withdrawal means for pulling said stranding element through said second vat with as low a tractive force as possible,
   at least one takeup reel disposed downstream of said auxiliary withdrawal means for receiving and storing said stranding element, and
   means for driving said at least one takeup reel.

2. An installation for producing a fiber optic stranding element comprising,
   payout means for paying out a continuous light-waveguide element,
   braking means associated with said payout means,
   extruding means located downstream of said payout means for extruding a continuous sheath onto said light-waveguide element and loosely encompassing said light-waveguide element,
   a first cooling vat downstream of said extruding means for cooling said sheath and said light-waveguide element to a first temperature $T_1$,
   first pulling means for pulling said sheath and said light-waveguide element together through said extrusion means and said first vat, said first pulling means cooperating with said braking means for keeping said light-waveguide element under a predetermined tension,
   a second cooling vat located downstream of said first pulling means, for cooling said sheath and said light-waveguide element from the first temperature $T_1$ to a second temperature $T_2$ lower than said temperature $T_1$, and
   second pulling means located downstream of said second cooling vat and arranged for pulling said sheath and said light-waveguide element together through said second cooling vat while keeping them under a tension force as low as possible, thus allowing said sheath to shrink when cooling.

* * * * *